US008301525B2

(12) United States Patent
Bray

(10) Patent No.: US 8,301,525 B2
(45) Date of Patent: Oct. 30, 2012

(54) METHOD AND SYSTEM FOR MANAGING COMMUNICATION OF INFORMATION

(75) Inventor: Adrian Gilmore Bray, Wilton, CT (US)

(73) Assignee: Citibank, N.A., New York, NY (US)

( * ) Notice: Subject to any disclaimer, the term of this patent is extended or adjusted under 35 U.S.C. 154(b) by 3608 days.

(21) Appl. No.: 09/728,468

(22) Filed: Nov. 30, 2000

(65) Prior Publication Data

US 2002/0099633 A1 Jul. 25, 2002

Related U.S. Application Data

(60) Provisional application No. 60/168,898, filed on Dec. 3, 1999.

(51) Int. Cl.
*G06Q 30/00* (2006.01)

(52) U.S. Cl. ........... 705/35; 705/26; 705/27; 705/36; 705/37; 705/38; 705/39; 705/40

(58) Field of Classification Search .......... 705/26, 705/27, 34, 38, 39, 40, 206, 35, 36, 37
See application file for complete search history.

(56) References Cited

U.S. PATENT DOCUMENTS

| | | | |
|---|---|---|---|
| 4,951,196 A | 8/1990 | Jackson | 364/4.01 |
| 5,119,465 A | 6/1992 | Jack et al. | 395/500 |
| 5,339,434 A | 8/1994 | Rusis | 395/700 |
| 5,491,473 A | 2/1996 | Gilbert | 340/870.01 |
| 5,557,780 A * | 9/1996 | Edwards et al. | 703/27 |
| 5,608,874 A | 3/1997 | Ogawa et al. | 395/200.15 |
| 5,715,397 A | 2/1998 | Ogawa et al. | 395/200.18 |
| 5,794,234 A | 8/1998 | Church et al. | 707/4 |
| 5,848,415 A * | 12/1998 | Guck | 707/10 |
| 5,864,827 A * | 1/1999 | Wilson | 705/35 |
| 5,956,688 A * | 9/1999 | Kokubo et al. | 705/1 |
| 5,991,806 A | 11/1999 | McHann, Jr. | 709/224 |
| 6,035,339 A | 3/2000 | Agraharam et al. | 709/246 |

(Continued)

FOREIGN PATENT DOCUMENTS

JP 10171723 A 6/1998

(Continued)

OTHER PUBLICATIONS

"Lead Story #4: Chemial and Citibank Race to Market Rival Corporate Confirmations Systems", FX Wee, v3, n14, pN/A, Aug. 24, 1992.*

(Continued)

*Primary Examiner* — Nga B. Nguyen
(74) *Attorney, Agent, or Firm* — Johnson, Marcou & Isaacs, LLC; John M. Harrington

(57) ABSTRACT

A method and system of managing communication of information to a destination utilizes computer hardware and software and a client-server architecture. The system receives information in file form, such as ASCII file form, via a file transfer service and/or in message-based form, such as SWIFT and/or ISITC messages, via a message network. The information that is received in message-based form is converted to file form by a message to file converter and translated by a message format library to an intermediary file format, and the information that is received in file form is also translated to the intermediary format by a message format library. The intermediary file format information can be aggregated and sorted, and is then translated to a preferred file format of the destination and sent to the destination.

57 Claims, 4 Drawing Sheets

U.S. PATENT DOCUMENTS

| | | | | |
|---|---|---|---|---|
| 6,039,245 A * | 3/2000 | Symonds et al. | | 235/379 |
| 6,350,066 B1 * | 2/2002 | Bobo, II | | 709/206 |
| 6,493,685 B1 * | 12/2002 | Ensel et al. | | 705/40 |
| 6,578,015 B1 * | 6/2003 | Haseltine et al. | | 705/34 |

FOREIGN PATENT DOCUMENTS

| | | | |
|---|---|---|---|
| WO | WO 96/37817 | A1 | 11/1996 |
| WO | WO 99/52047 | A1 | 10/1999 |

OTHER PUBLICATIONS

"MINT Communications Systems: MINT intoduces new XML capabilities", M2 Presswire, Sep. 24, 1999.*

"Financial Messaging Middleware: Riding High-for Now", Secuirities Industry News, vX, n31, p. 9, Aug. 10, 1998.*

"MINT: Swift gold medal minted", M2 Presswire, May 11, 1998.*

Australian Search Report for Singapore Application No. 200007232-2, dated Jul. 24, 2002 (mailing date).

Australian Examination Report for Singapore Application No. 200007232-2, dated Jul. 24, 2002 (mailing date).

"Getting a Grip on Global STP", Wall Street & Technology; May 1998.

"State Street System Links Advisers and Custodians", Wall Street & Technology; Dec. 1997.

"Straight-Through Processing: Still an Impossible Dream?"; Bank Technology News; Dec. 1, 1997.

"Information Technology Issues for the Attest, Audit, and Assurance Services Functions"; CPA Journal; May 1999.

* cited by examiner

METHOD AND SYSTEM FOR MANAGING COMMUNICATION OF INFORMATION

PRIORITY APPLICATION

This application claims the benefit of U.S. Provisional Application No. 60/168,898 filed Dec. 3, 1999, and entitled "Method And System For Communicating Financial Information (IPN)," incorporated herein by this reference.

FIELD OF THE INVENTION

The present invention relates generally to the field of methods and systems for managing the communication of information, and more particularly, to an automated method and system for managing the communication of information, such as financial information, from one or more sources to one or more destinations.

BACKGROUND OF THE INVENTION

In the past, various entities, such as the retirement systems of certain municipalities, have experienced substantial financial problems which resulted at least in part from a lack of knowledge of their cash and asset positions (investments). As a result, the governing bodies of such entities have ascertained a compelling need to have a better knowledge of their investments and of the flow of information between such entities as, for example, the plan sponsor of a pension fund, and the investment managers which manage investments of the funds, as well as the custodians, such as banks, in order to reconcile information concerning such investments.

This need for a more complete knowledge is not isolated to any particular plan sponsor, and the need is also evident, in general, among all entities which manage money entrusted to them by third parties. For example, a plan sponsor may have a relatively large number of investment managers who manage monies on behalf of the pension or retirement fund, and the plan sponsor may generally have a single custodian or multiple custodians. Typically, each investment manager has a different way of managing investments and has different systems to keep track of investment portfolios. In order for the plan sponsor to fully understand the trading activity which each investment manager is undertaking, a portfolio management system offers a partial solution.

However, it is also important for the plan sponsor to have a means for delivering information from its investment managers into its portfolio management system on the trade date or as soon thereafter as possible. In order to address that issue, currently, once the plan sponsor deploys its portfolio management system, it informs every investment manager that the investment manager must fax or provide information about the trade on the trade date, or no later than the day after the trade date, which is known as trade date plus one. As a result, each fund manager faxes in all of the trade details, and it is then necessary for plan sponsor personnel to key in this information, which is time-consuming and error prone and which causes many problems.

SUMMARY OF THE INVENTION

It is a feature and advantage of the present invention to provide a method and system for computerized information management which enables receiving information from multiple sources and automatically delivering the information to one or more destinations in a consistent manner.

It is another feature and advantage of the present invention to provide a method and system for computerized information management which enables receiving data in various formats, automatically translating the data to a preferred format of one or more destinations, such as one or more interested parties, and automatically sending the translated data to the destination or destinations in the preferred format.

It is still another feature and advantage of the present invention to provide a method and system for computerized information management which enables automatically translating data from various formats, such as American Standard Code for Information Interchange (ASCII) files or Society for Worldwide Interbank Financial Telecommunication (SWIFT) messages or Industry Standardization for Institutional Trade Communications (ISITC) messages, to an intermediary format, then sorting, ordering, and filtering the data, and then automatically translating to the preferred format of one or more destinations, such as one or more interested parties.

It is an additional feature and advantage of the present invention to provide a method and system for computerized information management which enables the regular scheduling of the automatic transfer of files from one or more sources to be translated, as well as the regular scheduling of the automatic transfer of the translated files to one or more destinations, such as one or more destinations.

It is a further feature and advantage of the present invention to provide a method and system for computerized information management which enables the secure communication of information, such as financial information, using, for example, encryption software, fire-walls, and networks, such as virtual private networks and/or the Internet.

To achieve the stated and other features, advantages and objects, an embodiment of the present invention utilizes, for example, computer hardware and software and a client-server architecture to provide a method and system for managing communication of information, such as financial information, which enables receiving information from one or more sources, such as one or more fund managers, and delivering the information to at least one destination, such as a plan sponsor, in a consistent manner. In an embodiment of the present invention, the information is received, for example, by a service provider from one or more sources, such as fund managers, in any number of different formats, such as file formats and/or message-based formats.

The different formats in which the information can be received include, for example, American Standard Code for Information Interchange (ASCII) files or Society for Worldwide Interbank Financial Telecommunication (SWIFT) messages or Industry Standardization for Institutional Trade Communications (ISITC) messages. Incoming files are translated to an intermediary format, and incoming messages are converted to file form and likewise translated to the intermediary format. The information is then automatically translated to a preferred format of a destination or interested party, such as a plan sponsor, and automatically sent to the destination.

In an embodiment of the present invention, information, such as financial information, is received in file form, such as ASCII file form, and/or message-based form, such as SWIFT messages and/or ISITC messages, from one or more sources, such as one or more fund managers. The file form information, which can be received according to a predefined schedule, is received via a file transfer service, for example, by an input file transfer service server or FTS (In) server of a service provider from a file transfer service client of a fund manager. Among other things, the input file transfer service server rejects bad file form information that is received by it. The information in message-based form is received via a message network, for example, by a message agent server of the service provider from a message node of an source, such as a fund manager.

The information that is received in message-based form is sent by the message agent server to a message to file converter where it is converted to file form. In turn, the converted file form information is sent to a message format library by the message to file converter where it is translated to an intermediary file format. Likewise, among other things, the message to file converter rejects bad message-based information that is received by it. The information that is received in file form by the input file transfer service server is sent by the input file transfer service server to a message format library where it is also translated to the intermediary file format. The intermediary file format information is then sent by one or both of the message to file converter and the input file transfer service server to an output file transfer service server or FTS (Out) server of the service provider, which sends the intermediary file format information to a message format library for translating to a preferred file format of one or more interested party destinations, such as one or more plan sponsors. After translating to the preferred file format of the destination, the translated information is sent to the destination or destinations via a file transfer service, for example, by the output file transfer service server of the service provider to a file transfer service client of the destination, such as the plan sponsor. The translated information can be sent to the destination automatically according to a predefined schedule.

Additional aspects of an embodiment of the present invention include, for example, automatic aggregation and/or sorting of the files in intermediary file format, the regular scheduling of automatic transfer of files from the source to the service provider, as well as the regular scheduling of the automatic transfer of translated files from the service provider to the destination.

Additional objects, advantages and novel features of the invention will be set forth in the description which follows, and it in part will become more apparent to those skilled in the art upon examination of the following, or may be learned by practice of the invention.

DETAILED DESCRIPTION

Figure 1:
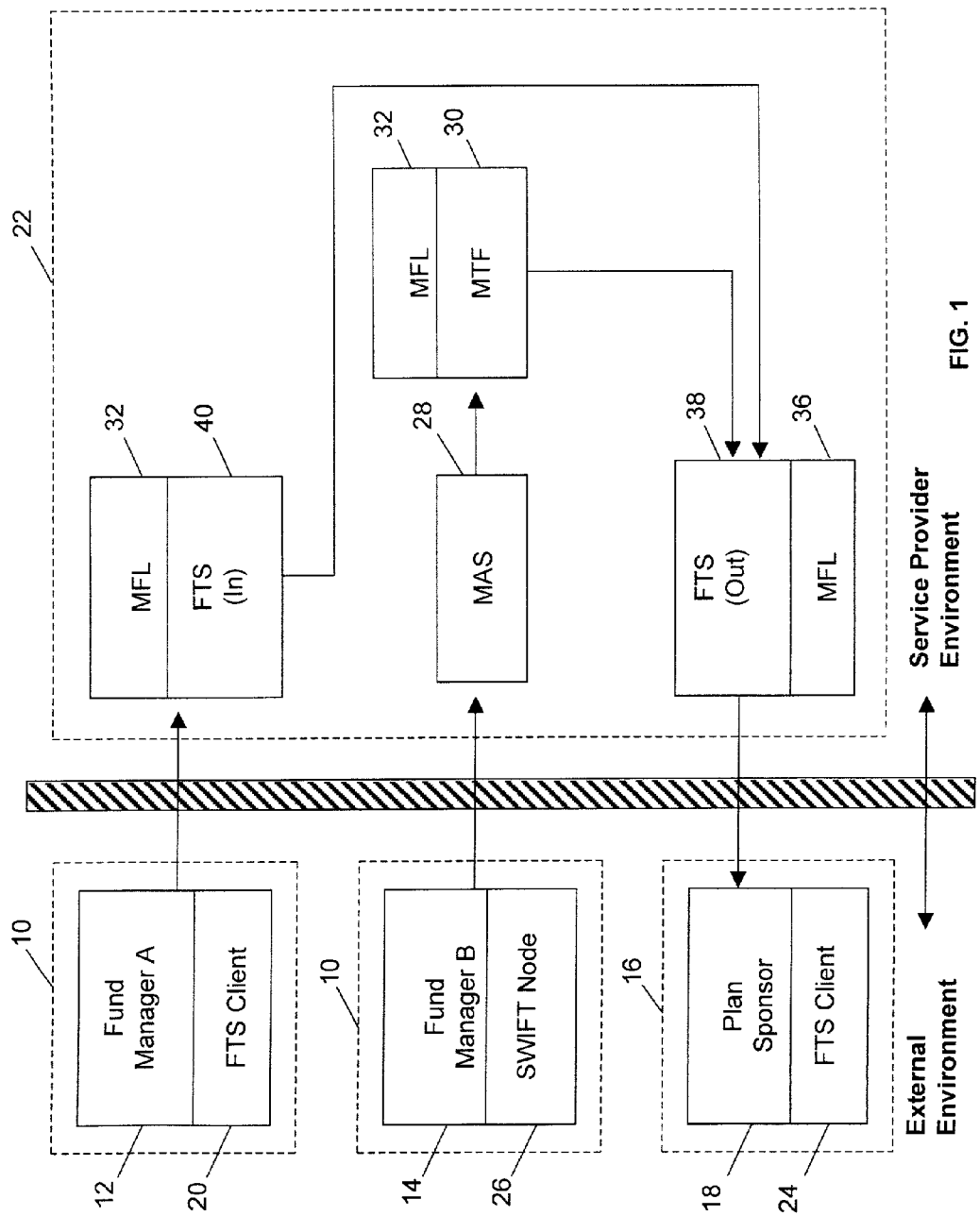
FIG. 1 is a schematic diagram which shows an example overview of the key components and the flow of information between the key components for an aspect of the interested party notification system for an embodiment of the present invention.
Figure 2:
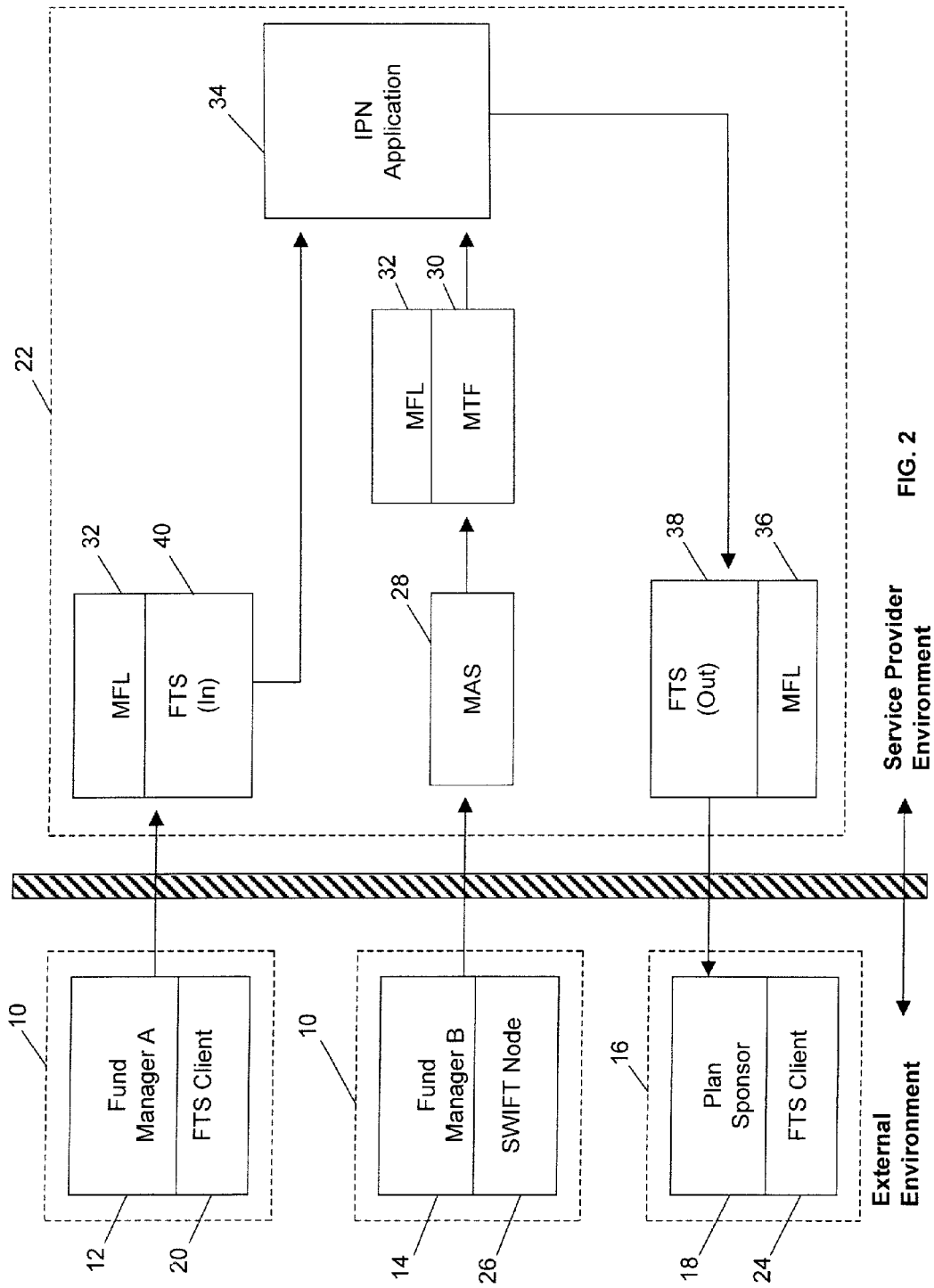
FIG. 2 is a schematic diagram which shows an example overview of the key components and the flow of information between the key components for another aspect of the interested party notification system for an embodiment of the present invention with aggregating and sorting functionality.

Referring now in detail to an embodiment of the present invention, an example of which is illustrated in the accompanying drawings, FIG. 1 is a schematic diagram which shows an example overview of key components and the flow of information between the key components for an aspect of the interested party notification (IPN) system for an embodiment of the present invention. FIG. 2 is a schematic diagram which shows an example overview of key components and the flow of information between the key components for another aspect of the IPN system for an embodiment of the present invention with aggregating and sorting functionality. Referring to FIGS. 1 and 2, an embodiment of the present invention makes use, for example, of computer hardware and software and a client-server architecture to take information from one or more sources 10, such as fund managers 12 and/or 14, and to deliver it to at least one destination 16, for example, for use in a portfolio management system of a plan sponsor 18, in a consistent and automated fashion. Instead of receiving information from each fund manager 12 and/or 14 by fax, an embodiment of the present invention enables the plan sponsor 18 to receive the information from the fund managers 12 and/or 14 in the most efficient format and standards, utilizing the existing infrastructure of each fund manager 12 and/or 14.

In an embodiment of the present invention, for an external information source 10, such as fund manager 12, that has its information in file form, a fund manager File Transfer Service (FTS) client 20 is deployed at the fund manager's site which, for example, takes in files of trade data in the fund manager's format and uploads those files to the data center of a service provider 22, such as a bank or other financial institution. At the data center of the service provider 22, the files can be automatically sorted and ordered. The files are automatically translated according to the requirements of the destination 16, such as plan sponsor 18, and downloaded to the plan sponsor 18. The translated files can be scheduled for automatic downloading, for example, once each day, or the downloading may be scheduled more or less often or automatically upon receipt, if requested. For an external information source 10, such as fund manager 14, which uses, for example, SWIFT messages to deliver the fund manager's trade instructions to a custodian (not shown), such fund manager is requested to send the SWIFT trade notification messages to the service provider 22. The SWIFT messages are taken in, converted to files, and treated in the same manner as files coming in from other sources, such as fund manager 12. The converted messages are put into the intermediary format and can be sorted, filtered, and ordered. The files are automatically converted from the intermediary format to the format of the destination 16, such as plan sponsor 18, and delivered to the plan sponsor 18 electronically in a seamless process.

An embodiment of the present invention makes use of a number of component parts employing client-server technology. The fund manager FTS client component 20 is disposed at an information source 10, such as fund manager 12, and a plan sponsor FTS client component 24 is disposed at a destination 16, such as plan sponsor 18. The FTS enables the scheduling of regular automatic file transfers from an source 10, such as fund manager 12, to a server at the data center of the service provider 22, as well as from the data center of the service provider 22 to a destination 10, such as plan sponsor 18. SWIFT messages come in from a source 10, such as the SWIFT node 26 of fund manager 14, to a Message Agent Server (MAS) 28, are put into a file, and are converted to an intermediary format in the IPN system of the service provider 22. The IPN system of the service provider 22 automatically creates files and archives and translates the data to the preferred format of the destination 16, such as plan sponsor 18, and automatically delivers the files to the plan sponsor FTS client 24 at the plan sponsor 18. In another aspect, an IPN application 34, as shown in FIG. 2, can automatically sort, filter, and order the data in the intermediary format.

In an embodiment of the present invention, a series of applications are coupled together into a seamless process that allows the destination 16, such as plan sponsor 18, to receive trade data electronically in a format consistent with the portfolio management system of the plan sponsor 18. An embodiment of the present invention also makes use of one or more networks, such as the Internet and/or dialing up over a carrier provider's Virtual Private Network (VPN), in order to transfer the files. For example, the information source 10, such as fund manager 12, logs in under a unique Identifier (ID) which gives the fund manager 12 access to the network, and the files are delivered to the data center of the service provider 22 via the VPN. The service provider 22 has relationships with various VPN carrier providers, so that each information source 10, such as fund managers 12 and/or 14, always has a backup carrier provider available. In addition, the data is encrypted and authenticated from the source 10, such as fund manager 12 and/or 14, using built-in software which provides the encryption methodology as the data leaves the source 10. Further, a firewall is established between the VPN and the IPN system managed within the environment of the service provider 22.

Referring further to FIGS. 1 and 2, as previously mentioned, the data can come in from sources 10 to the data center of the service provider 22 in various formats. The data that comes in, for example, as SWIFT messages are put into the MAS 28. The data are collected there and then moved into a Message to File converter (MTF) 30, which converts the messages into a file. This file of SWIFT messages and the files that come in from sources 10, for example, in ASCII format are also converted into an intermediary format via the Message Format Library (MFL) 32. These files can then be put through the IPN process 34, as shown in FIG. 2, where they are sorted into the exact files that the destination 16, such as plan sponsor 18, wants, such as buys and sells of domestic equities, as well as other sorting as required by the plan sponsor 18. In addition to sorting, the IPN application 34 also creates an exception file, as well as other archive files. Referring once more to FIGS. 1 and 2, the files in intermediary format are then put through another MFL process 36, where they are converted into a format which is the preferred format of the destination 16, such as the portfolio accounting system format of the plan sponsor 18. The files are then sent via the FTS (Out) 38 to the destination 16, such as plan sponsor 18.

For sources 10 that are not sending SWIFT messages, such as fund manager 12, the client portion of the FTS software 20 is installed at the source 10, such as the site of fund manager 12. The FTS software can be configured to automatically schedule the files to leave at various times during the day. The files, such as ASCII files, are received from the fund manager 12 via the FTS client 20 into the service provider's FTS (In) server portion 40 at the site of the service provider 22. The files are converted into intermediary format and can then be sent through the IPN process 34, as shown in FIG. 2, where they can be sorted, ordered, and filtered, if desired. The files in intermediary format are sent into the MFL 36, where there are profiles and tables to convert the information to the preferred format of the destination 16, such as the plan sponsor 18.

In an embodiment of the present invention, when the information comes in from an source 10, such as fund manager 14, via SWIFT messages, it goes through a slightly different route. A SWIFT message comes in via the SWIFT network 26 and then goes into the MAS 28 of the service provider 22. The SWIFT message is then sent to the MTF 30, where it is converted from the message to a file, so it can now also be converted into intermediary format by the MFL 32. Once these files are converted, they can be put into the IPN process 34, as shown in FIG. 2, where they can be sorted based on criteria furnished by a customer, such as the plan sponsor 18. The system takes other information and puts it into an exception file, and then outputs, for example, two files for each customer, such as each fund manager, converts them into the format specified by the customer, such as the plan sponsor 18, and sends the files via the service provider's FTS (Out) server 38 to the plan sponsor client FTS 24. The system for an embodiment of the present invention can handle one or more destinations for data, such as plan sponsor 18, and one or more sources of data, such as fund managers 12 and/or 14.

In an embodiment of the present invention, a typical customer is a fund manager, such as fund manager 12 and/or 14, who is managing money that has been given or entrusted to the fund manager by another customer, such as plan sponsor 18. The fund manager 12 and/or 14 is instructed, under certain criteria, to manage the money in a certain way and to try to make the money grow. Each fund manager has a different mission. For example, one fund manager may be investing in international equities, another fund manager may be investing in domestic equities, another fund manager may be a fixed income investor, and still another fund manager may be managing money in derivatives. Each fund manager has a specific skill which the plan sponsor 18 has evaluated, and the plan sponsor 18 thinks each is a good manager for the particular type of instrument.

An example of what gives rise to the actual transmission of files or messages in an embodiment of the present invention is any trade which takes effect between a fund manager, such as fund managers 12 or 14, and a broker (not shown). The trades may involve, for example, U.S. domestic equities or international or foreign equities. For example, if the fund manager 12 or 14 feels that a particular equity will rise in value, the fund manager may buy shares for the portfolio, or if the fund manager thinks the particular equity will fall, the fund manager can sell shares. It is the actual trade between the fund manager 12 or 14 and the broker which gives rise to a trade transaction that is then put into a message or file which is sent to the service provider 22. While the fund manager 12 or 14 also needs to transfer information to a custodian (not shown), which is typically a single custodian, the present example focuses primarily on the fund manager's need to pass the information to a plan sponsor, such as plan sponsor 18.

In an embodiment of the present invention, the information is automatically transmitted into the destination, such as the system of the plan sponsor 18. The plan sponsor 18 can then compare the information with information which the plan sponsor 18 may receive from another source, such as a custodian, and thus reconcile the trades done by a fund manager, such as fund managers 12 and/or 14. In the system for an embodiment of the present invention, it is assumed that the fund manager 12 and/or 14 has already confirmed any trades with the broker, and that the files which the plan sponsor 18 receives from the system relate only to trades which have already been confirmed between the fund manager 12 and/or 14 and any broker. The "interested party" in the term "interested party notification" is a destination 16, such as plan sponsor 18. An actual trade that is performed between a fund manager, such as fund manager 12 or 14, and a broker generally generates a message to a custodian. Thus, the fund manager 12 or 14 and the broker are principals in the trade transaction, and the custodian is a critical party to the trade transaction because the custodian has custody of the assets and moves the money, for example, on behalf of the plan sponsor 18. The reason that the plan sponsor 18 is considered to be the "interested party" in this example, is that the money of the plan sponsor 18 is being used in the transaction.

It should be noted that the examples and references herein to the plan sponsor 18 as the "interested party" or "destination" are not intended to be limiting and that an embodiment of the present invention has application equally to any similarly situated entity, organization, corporation or the like which may be managing funds on behalf of itself or of a third party. Generally, an embodiment of the present invention is ideally suited for entities which manage money entrusted to them by third parties and who need certain information about their investment activities. For example, an embodiment of the present invention has application for a corporation's treasury group and/or it's pension fund which needs to reconcile fund manager activity against reports received from a custodian. For another example, an embodiment of the present invention also has application to an entity, such as a financial institution, which has a pension fund and is using an outside investment agent, for example, because of rules or regulations governing in-house management, as well as any number of other entities which, for one reason or another, use outside money managers. An important aspect of an embodiment of the present invention is the ability to receive files in various formats and, using the message format library or MFL 32, to automatically convert the files into practically any other format in which an "interested party" wants to receive the files.

Figure 3:
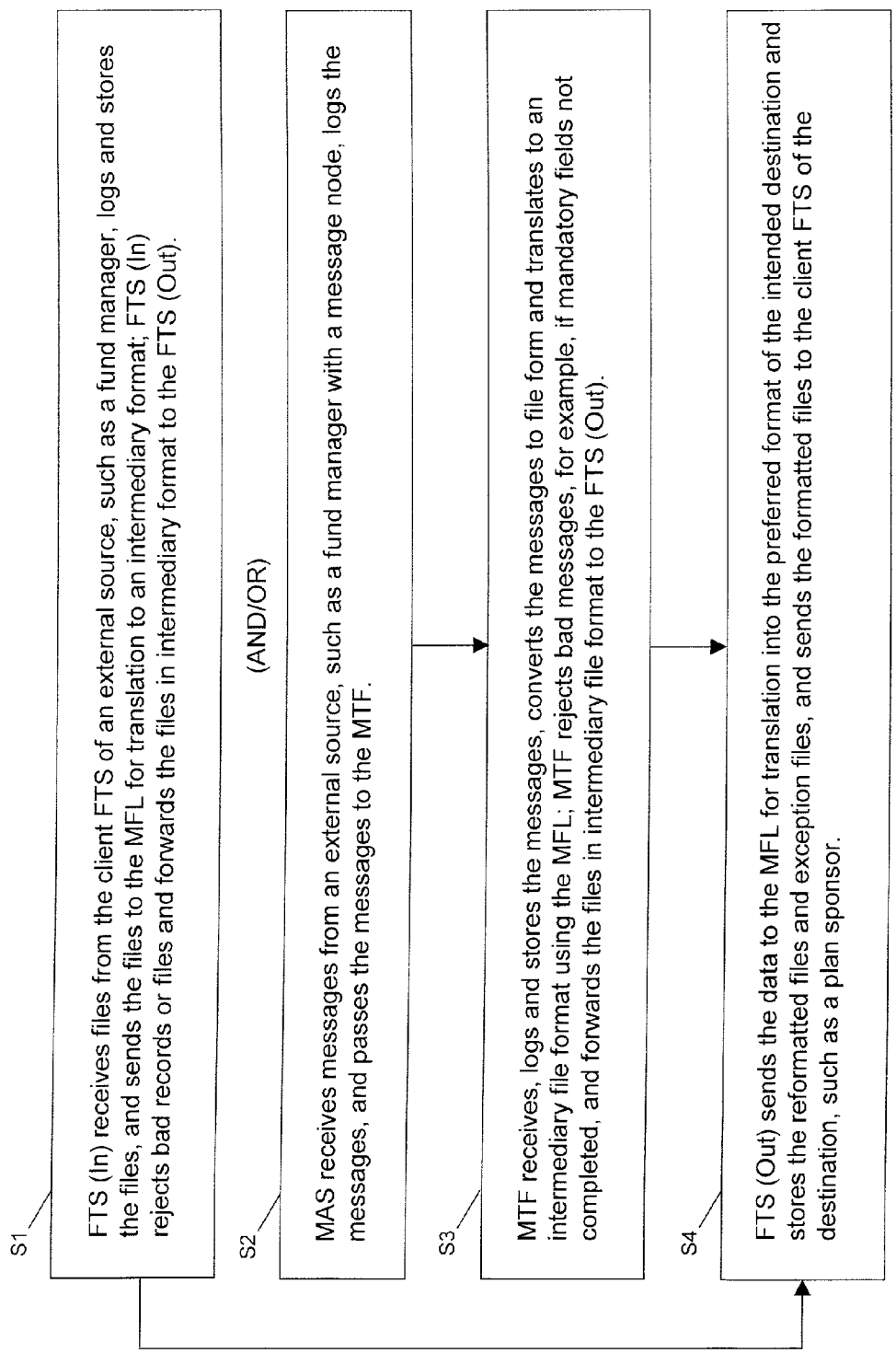
FIG. 3 is a flow chart which illustrates an example of an aspect of the process of interested party notification for an embodiment of the present invention.

FIG. 3 is a flow chart which illustrates an example of an aspect of the process of interested party notification for an embodiment of the present invention. Referring to FIG. 3, at S1, the FTS (In) 40 receives files from an source 10, such as fund manager 12, logs and stores the files, and sends the files to the MFL 32 for translation to an intermediary format. In addition, at S1, the FTS (In) 40 rejects bad records or files and forwards the files in intermediary format to the FTS (out) 38. Alternatively, at S2, the MAS 28 receives messages, such as SWIFT messages, from an source 10, such as fund manager 14, with a SWIFT node 26, logs the messages, and passes the SWIFT messages to the MTF 30. At S3, the MTF 30 receives, logs and stores the SWIFT messages, converts the messages to file, and translates the messages into an intermediary format using the MFL 32. Also, at S3, the MTF 30 rejects bad messages, for example, if mandatory fields are not completed, and forwards the files in intermediary format to the FTS (Out) 38. At S4, the FTS (Out) 38 receives the data in intermediary format, sends the data to the MFL 38 for translation into the preferred format of the destination, such as plan sponsor 18. For example, the data can be translated into either the format of a portfolio management system, also referred to as an Investment Accounting System (IAS), of a destination 16, such plan sponsor 18, or exception files. Also at A4, the FTS (Out) 38 logs and stores the IAS-formatted and exception files, and sends the formatted files to the FTS 24 of a destination 16, such as plan sponsor 18.

Figure 4:
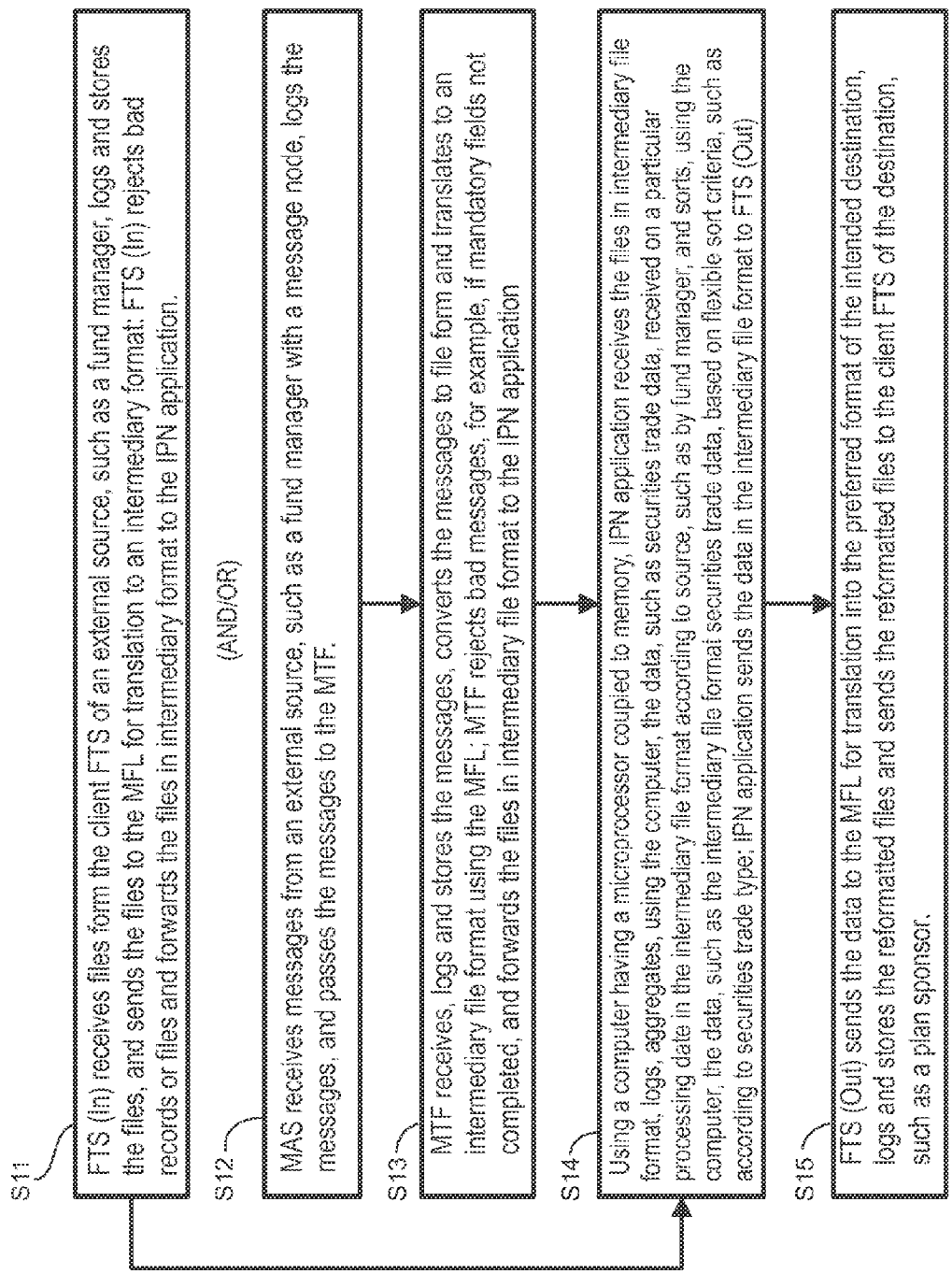
FIG. 4 is a flow chart which illustrates an example of another aspect of the process of interested party notification for an embodiment of the present invention which includes aggregating and sorting of data.

FIG. 4 is a flow chart which illustrates an example of another aspect of the process of interested party notification for an embodiment of the present invention which includes aggregating and sorting of data. Referring to FIG. 4, at S11, the FTS (In) 40 receives files from an source 10, such as fund manager 12, logs and stores the files, and sends the files to the MFL 32 for translation to an intermediary format. In addition, at S11, the FTS (In) 40 rejects bad records or files and forwards the files in intermediary format to the IPN application 34. Alternatively, at S2, the MAS 28 receives messages, such as SWIFT messages, from an source 10, such as fund manager 14, with a SWIFT node 26, logs the messages, and passes the SWIFT messages to the MTF 30. At S3, the MTF 30 receives, logs and stores the SWIFT messages, converts the messages to file, and translates the messages into an intermediary format using the MFL 32. Also, at S3, the MTF 30 rejects bad messages, for example, if mandatory fields are not completed, and forwards the files in intermediary format to the IPN application 34.

Referring further to FIG. 4, at S14, the IPN application 34 receives the files in intermediary format, aggregates the data received on a particular processing date by fund manager, and sorts the data based on flexible sort criteria. For example, at S14, the IPN application 34 can separate the data into data files to be converted to IAS (domestic equity trades) and into exception file (cancels, amends, non-domestic equity trades), and can sort domestic equity trades primarily by trade date and secondarily by purchases and then sales. Also, at S14, the IPN application 34 logs and sorts the intermediary data, which may be required for internal diagnostic purposes, sends the data to the FTS (Out) 38, and can produce a count of the number of records by fund manager in the domestic equity file to be used, for example, for billing purposes). At S15, the FTS (Out) 38 sends the data to the MFL 38 for translation, for example, into either IAS-formatted or exception files, logs and stores the IAS-formatted and exception files, and sends the formatted files the client FTS 24 of a destination 16, such as the plan sponsor 18.

The IPN service for an embodiment of the present invention routes and aggregates post dealing trade details from sources 10, such as fund managers 12 and 14, to the portfolio management system or IAS of the destination 16, such plan sponsor 18, for reporting, reconciliation, and distribution purposes. The IPN service can be implemented, for example, by building on top of infrastructure components, such as the MAS 28 and the MTF 30 for receiving messages, such as SWIFT messages, the FTS 20, 40, 24 and 38 for file transfer and the MFL 32 and 36 for message validation and translating. The IPN application 34 is a component that performs the optional aggregation and sorting functionality of an aspect of the IPN service, and which interfaces with and relies on certain existing components. The IPN component 34 is an optional part of the IPN service. Unless otherwise specified, the terms "IPN application" or "IPN process" refer to the IPN component 34 that performs the optional aggregation and sorting functionality of the IPN service, as opposed to the overall IPN system.

The IPN application 34 for an embodiment of the present invention can process input files with trade data, for example, once per process day, such as Monday through Friday, irrespective of holidays, at a specified time. There may be multiple input files per fund manager, but each input file contains data for one fund manager, such as fund manager 12 or 14. For each fund manager 12 or 14, the IPN application 34 can aggregate data from all input files received and split them into two or more output files. One of the output files contains, for example, all domestic equity trades, and another output file, referred to as an "exception file," contains, for example, all other trades, such as cancels, amends, and/or non-domestic equity trades. The IPN application 34 can sort domestic equity trades based on flexible sort criteria. For example, the primary sort criterion can be by trade date and the secondary sort criterion can be by purchases and then sales. The IPN application 34 can also archive all input and output files which may be required for diagnostic purposes. In addition, the IPN application 34 can produce a count of the number of records by fund manager in the domestic equity file to be used, for example, for billing purposes.

The IPN application 34 for an embodiment of the present invention can take the input files from, and place the output files into, particular pre-existing directories on the machine it is running. No other interfaces to the infrastructure components, such as the FTS 38 and 40 and/or the MTF 30, are needed. Assuming that the IPN application 34 is running continuously, it can start processing the input files automatically at a specified time every day, such as Monday through Friday, and does not require a Relational Database Management System (RDBMS) to perform its processing. Configurable attributes, such as input and output directory names and start time, are provided in a .INI file: FTSIN/FTSOUT directory, IPN Root directory, and StartProcessingTime in a predefined format. Sorting criteria are specified in the .INI file using a predefined format, and change of sorting criteria does not involve a code change. The IPN service recovers from errors gracefully, provides unattended continuous operation, and is implemented, for example, in C++. The IPN application 34 assumes that incoming data are validated by other components, such as the FTS 40 and the MTF 30. Broker code replacement functionality is implemented by the MFL 32. For SWIFT messages that come in via the MTF 30, there is one translation table that can map the various SWIFT message variations.

Referring again to FIGS. 1 and 3, in an aspect of an embodiment of the present invention, the FTS (Out) 38 receives files in intermediary format from the FTS (In) 40 and/or the MTF 30 and sends the files directly to the MFL 36 for translation to the preferred format of the destination 16, such as plan sponsor 18. Referring to FIGS. 2 and 4, in an optional aspect of an embodiment of the present invention, the IPN application 34 receives files in intermediary format from the FTS (In) 40 and/or the MTF 30, aggregates and sorts the files, and sends the results to the FTS (Out) 38 for translation by the MFL 36 and forwarding to the plan sponsor 18. In this aspect, the IPN application 34 performs message aggregation and sorting only. The transfer of files from the source 10, such as fund managers 12 and/or 14, and to the destination 16, such as plan sponsor 18, is performed by the FTS 20, 40, 36 and 24. Filtering and validation of messages is done by the FTS (In) 40 and the MTF 30. There are, for example, two sources of input messages to the IPN application 34. Depending on the fund manager's technical capability, the fund manager can either upload files via the FTS (In) 40, or send SWIFT messages via the MAS 28.

Referring further to FIGS. 2 and 4, for messages uploaded in files through the FTS (In) 40, the FTS (In) 40 performs message validations, and converts the files to intermediary format (pipe delimited) before saving them in an IPN application directory. The IPN application 34 interfaces with the FTS (In) 40 via this directory. For SWIFT messages coming in, the MTF 30 takes the messages from the MAS 28 and saves them in files. The MTF 30 is configured to save the messages in a particular application directory. The IPN 34 interfaces with the MTF 30 via this directory. Both FTS (In) 40 and MTF 30 use MFL 32 to validate and convert messages from proprietary fund manager formats and SWIFT format to intermediary format. The IPN application 34 deals only with intermediary format messages. After sorting, the IPN application 34 drops the files in a predetermined directory for the FTS (Out) 38 to pick up. The file names have an ID embedded that tells the FTS 38 where to send the file. Similarly to the interface with the FTS (In) 40, the predetermined disk directory is the only interface between the IPN application 34 and the FTS (Out) 38. An INI attribute IPN_ROOT is used to designate the IPN root directory as follows:

| IPN_ROOT | | |
|---|---|---|
| +------------ | INARCHIVE | (archived input files) |
| +------------ | OUTARCHIVE | (archived output files) |
| +------------ | REPORT | (monthly traffic report files for billing purposes) |
| +------------ | LOG | (daily log files) |
| +------------ | OUT | (output files to move to the FTS OUT) |
| +------------ | WORK | (IPN working directory; may contain subdirectories for internal IPN use) |

The IPN application 34 for an embodiment of the present invention wakes up at a specific time, which is configurable via .INI file, each business day, for example, on Monday through Friday, and performs the following activities:

Move files from FTS (In) directory to IN directory.

Move files from MTF directory to IN directory

In aggregating messages from the FTS (In) 40 and the MTF 30 files, using a sort utility, the IPN application 34 splits aggregated messages, for example, into domestic equity trade and exception files and sorts according to the specification in the .INI file. Output files are generated in the OUT directory. The two types of destination files, domestic equity files and exception files, have different file name extensions as specified in the .INI file. The files are copied from OUT to the FTS OUT directory. Files are moved from IN to INARCHIVE and from OUT to OUTARCHIVE, the archive directory is cleaned up by deleting expired archive files after a storage time specified in the .INI file, and the record count file(s) are updated.

Each time the IPN application 34 for an embodiment of the present invention starts up, it checks if the last processing cycle did not complete, in which case it reprocesses the last cycle files, and it checks if the previous scheduled time has been missed, in which case it starts processing all files in the FTS IN and MTF IN directories. Sorting criteria is specified in the .INI file, instead of being hard-coded. The IPN application 34 does not need to do validation of the message, as it is assumed that the MFL 32 performs all the validation. In particular, the IPN application 34 does not need to do any IAS business validation. It is assumed that the destination 16, such as plan sponsor 18, does the validation itself.

The following are the configurable parameters of IPN service:
    (IPN Data Root Directory)
    IPN_DATA_ROOT=
    FTSIN_DIRECTORY=
    MTFIN_DIRECTORY=
    FTSOUT_DIRECTORY=
    (1st file extension—domestic equity trades)
    FILE1_EXTENSION=BS
    (2nd File Extension)
    FILE2_EXTENSION=EXC
    (Names of the files that contain sorting and filtering parameters for domestic equity trades and exceptions, respectively. Each line in the parameter files is in the format of the sort utility's control statement.)
    SORT_PARAMETER_FILE1=
    SORT_PARAMETER_FILE2=
    WAKEUP_TIME=
    (Number of days to keep archived files)
    ARCHIVE_EXPIRATION_TIME=
    (Customer ID defined in FTS)
    FTS_CUSTOMER_ID=PLAN SPONSOR Some entries may be omitted, such as MTF directory, but most are required. If a required entry is missing, the IPN application 34 logs an error message, if possible, and quits.

The file name is IPN.INI. The file is placed in the same directory as the IPN application 34.

It is assumed that the FTS (In) component 40 rejects messages with missing fields or otherwise ill formatted. Messages passed into the IPN application 34 are assumed to be acceptable to forward on to the destination 16, such as plan sponsor 18. The FTS (Out) 38 does not reject any messages originating from the IPN application 34. In case it does receive a message that it cannot process, an administrator alarm is sent by FTS (Out) component 38. Errors are logged into a log file in the LOG directory with a line format of timestamp and error message and a file name of IPNYYYYMMDD.LOG. If there is another session in the same day, errors are appended to the same file. Error files are kept for 45 days.

The IPN application 34 for an embodiment of the present invention receives files from the FTS 40 and/or MTF 30 using the following convention:

<timestamp>.<FundMgrID>.<FileName><Extension>,
e.g., 1999030513163800.SU2Y.TRADES.TRN.

The IPN application 34 outputs files using the following convention:

<timestamp>.<FTSCustomerID>.<FundMgrID>.<Extension>

The <FundMgrID> in the output file is copied from the <FundMgrID> in the input file. The IPN application 34 creates the output file <timestamp>. The <FTSCustomerID> and the <Extension> in the output files are parameters in the IPN.INI file.

E.g., 1999030513183800.PLAN SPONSOR.S2Y.IAS
//IAS file
1999030513183800.PLAN SPONSOR.SU2Y.EXC
//Exception file
<TimeStamp>.<UserID>.<FileName>.<Extension>

The <TimeStamp> is YYYYMMDDHHMMSSmm (mm is the first two digits of milliseconds). Timestamp is the current time. The Extension is File1_Extension or File2_Extension from the .INI file. Wake up time is specified in 24 hours format, in the same time zone as the machine being deployed.

Text files are created, for example, at the start of each month to record the number of IAS records sent to the destination 16, such as plan sponsor 18, each day. Two text files are created, one for the IAS file and one for the exception file. Each text file shows the total record count per fund manager, one line per fund manager. The file name format is:
IPNYYYYMM.BIL.

The format of each entry in the file is:
<Date>, <FundMgrID>, <#records>

The file resides in a REPORT subdirectory, can be downloaded using the MAS admin GUI, and can be imported into an Excel spreadsheet to sum up the monthly total.

In an aspect of an embodiment of the present invention, the IPN application 34 archives all input and all output files received. Although the IPN archive files are in intermediate format and thus cannot be used to satisfy the business requirements of archiving original files, they can be useful in diagnostics. The intermediate format files archived retain their original names. Archives of input files from the FTS (In) 40 and the MTF 30 are kept in the INARCHIVE directory. Archives of output files to the FTS (Out) 38 are kept in OUTARCHIVE directory. These files can be browsed or downloaded using the MAS Admin program. The sorting algorithm is able to handle large data files and does not rely on reading all records into memory.

In an aspect of an embodiment of the present invention, the objective of the IPN service is to route and aggregate post dealing trade details from one or more sources 10, such as fund managers 12 and/or 14, to one or more destinations 16, such the IAS of plan sponsor 18, for reporting, reconciliation, and distribution purposes. The overall scope of an aspect of the IPN service includes, for example, receiving affirmed transaction data in various formats from fund managers 12 and/or 14, consolidating transaction data daily by fund managers, delivering trade data for domestic equities in IAS format sorted by type of transaction, one file per fund manager, to the plan sponsor 18, and delivering cancellations and amendments in a comma separated values (CSV) file to the plan sponsor 18. In this aspect, the overall scope of the IPN service also includes, for example, delivering trade data for domestic equities for an expanded list of fund managers to the plan sponsor 18, delivering trade data for securities other than domestic equities for an expanded list of fund managers to the plan sponsor 18, delivering security ID updates to the plan sponsor's security master file, and providing reconciliation of trade data reported by fund managers and custodian bank.

In this aspect of an embodiment of the present invention, information, such as trade data, is received from sources 10, such as fund managers 12 and/or 14, at least by the trade date plus one day. Data received from fund managers 12 and/or 14 is for affirmed trades, such as trades confirmed between a broker and fund manager 12 or 14 through DTC. The fund managers 12 and/or 14 deliver this information, for example, by 10 A.M. PST on the trade date plus one day. Trade data is received in various formats, such as SWIFT, ISITC, and ASCII, and may be file or message-based. Fund managers sending files generally send one file each day, but may send more than one file. Files are delivered via the FTS 20 or 40, and message-based trades are delivered via SWIFT node 26 to the MAS 28. There are one or more trades per message.

The trade data is collected by fund manager daily and converted from the fund manager format into IAS format for TA purchases and TA sales. One output file is created per fund manager per day. The trade data included in the IAS-formatted file is sorted by type of transaction in the following order:

Purchases
  Buys
  Covers
  Receipts
Sales
  Sells
  Shorts
  Delivers

As part of the conversion to IAS, the IPN service converts the fund manager broker code to the plan sponsor's broker code. If the IPN service does not recognize the fund manager broker code, such as if it does not exist in the fund manager broker table, the IPN service converts the fund manager broker code to XXX. The fund manager broker table is updated once it receives the corresponding plan sponsor broker code from plan sponsor.

One output file is also created in CSV format listing all cancelled trades and trade amendments. Should trade data received from the fund manager 12 or 14 include transactions other than purchases, sales, cancels, or amends, this data is be ignored. The files in IAS format and the CSV files are available for the plan sponsor 18, for example, by a predetermined time of day. The files are delivered to a directory to be specified at the plan sponsor FTS client 24. The plan sponsor 18 polls the directory for new files to be loaded into IAS. If no trade data is received from a particular fund manager 12 or 14 on a particular day, no IAS or CSV file is generated. Each fund manager 12 and/or 14 notifies the plan sponsor 18 that no trade data should be expected. On an as-requested basis, the trade data is forwarded in original fund manager format to the plan sponsor 16 via e-mail. It is possible to do this for a particular trade date for data received in the last 7 days.

In an embodiment of the present invention, set-up input requirements for the sources 10, such as fund managers 12 and 14, include, for example, file/message formats for mapping to IAS format, listing of broker codes, and operational contacts. Set-up input requirements for the destination 16, such as plan sponsor 18, include, for example, mapping of broker codes to fund manager broker codes. On-going input requirements for the plan sponsor 18 include, for example, updates to mapping of plan sponsor broker codes to fund manager broker codes. The FTS 20, 40, 36 and 24 is installed at each of the sources 10, such as fund managers 12 and 14, and at the destination 16, such as plan sponsor 18. The IPN service reports the number of trades sent to IAS by fund manager by day and consolidates this information for the month, for example, for billing purposes. Status reports detailing any trades rejected by the IPN service are available to the fund managers 12 and/or 14 via the FTS. Data can be received from multiple sources, such as fund managers 12 and 14, and each fund manager 12 and/or 14 can process any number of trades per day. For example, in one aspect, the IPN service is designed to handle up to 10,000 trades per month from up to 30 fund managers sending trade data. Trade data is available, for example, for 90 days on-line access and is then moved off-line and archived.

In an embodiment of the present invention, each source 10, such as fund manager 12 or 14, ensures that all data has been affirmed and that it is sending trade data for domestic equities only. Each fund manager 12 or 14 delivers trade data by a predetermined time on trade date plus one day. Fund managers sending no trade data on a particular day should inform the destination 16, such as plan sponsor 18, that no trades were intended to be sent. Any IAS-formatted files or CSV-files which are not readable by the plan sponsor 18 are resent. IAS-formatted files and CSV-files are provided in the specified directory of the plan sponsor FTS client 24 by a predetermined time, such as 2 P.M. PST. The message library is updated with updates to the mapping of the plan sponsor broker code to fund manager broker code, for example, within one week of receipt of the mapping information from the plan sponsor 18. On an as-requested basis, the trade data is forwarded in the original fund manager format to the plan sponsor 18 via e-mail. Fund managers 12 and 14 daily check status reports detailing any trades rejected by the IPN service, which are available to the fund managers via the FTS. Trade data received from the fund manager 12 or 14 should not include transactions other than purchases, sales, cancels, or amends Various preferred embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the present invention.

What is claimed is:

1. A method for managing communication of securities trade data to a plurality of destinations, comprising:
   receiving, using a computer having a microprocessor coupled to memory, securities trade data both in file form and in a plurality of different financial markets trade message protocol formats;
   converting, using the computer, the securities trade data that is received in the plurality of different financial markets trade message protocol formats to an intermediary file format;
   translating, using the computer, the securities trade data that is received in file form to the intermediary file format;
   aggregating, using the computer, the intermediary file format securities trade data according to source;
   sorting, using the computer, the intermediary file format securities trade data according to securities trade type;
   translating, using the computer, the aggregated and sorted intermediary file format securities trade data to preferred file formats of the plurality of destinations; and
   sending, using the computer, the securities trade data in the preferred file formats to the plurality of destinations.

2. The method of claim 1, wherein receiving the securities trade data further comprises receiving the securities trade data from a plurality of fund managers.

3. The method of claim 1, wherein receiving the securities trade data further comprises receiving the securities trade data according to a predefined schedule.

4. The method of claim 1, wherein receiving the securities trade data in file form further comprises receiving the securities trade data in file form via a file transfer service computer software application process executing on the computer.

5. The method of claim 4, wherein receiving the securities trade data in file form via the file transfer service further comprises receiving the securities trade data in file form by an input file transfer service computer software application process executing on the computer from a file transfer service client.

6. The method of claim 5, wherein receiving the securities trade data by the input file transfer service server further comprises rejecting bad file form securities trade data by the input file transfer service computer software application process executing on the computer.

7. The method of claim 1, wherein receiving the securities trade data in file form further comprises receiving the securities trade data in ASCII file form.

8. The method of claim 1, wherein receiving the securities trade data in the plurality of different financial markets trade message protocol formats further comprises receiving the securities trade data in message-based form via a message network.

9. The method of claim 8, wherein receiving the securities trade data in message-based form via the message network further comprises receiving the securities trade data in message-based form by a message agent computer software application process executing on the computer from a message node.

10. The method of claim 1, wherein receiving the securities trade data in the plurality of different financial markets trade message protocol formats further comprises receiving the securities trade data in at least SWIFT message form and ISITC message form.

11. The method of claim 1, wherein converting the securities trade data further comprises converting the securities trade data that is received in the plurality of different financial markets trade message protocol formats to file form by a message to file converter computer software application process executing on the computer.

12. The method of claim 11, wherein converting the securities trade data further comprises receiving the securities trade data in the plurality of different financial markets trade message protocol formats by the message to file converter computer software application process executing on the computer from a message agent computer software application process executing on the computer.

13. The method of claim 11, wherein converting the securities trade data further comprises translating the converted file form securities trade data to the intermediary file format.

14. The method of claim 13, wherein converting the file form securities trade data further comprises translating the converted file form securities trade data to the intermediary file format by a message format library computer software application process executing on the computer.

15. The method of claim 14, wherein converting the file form securities trade data further comprises receiving the converted file form securities trade data by the message format library computer software application process executing on the computer from the message to file converter computer software application process executing on the computer.

16. The method of claim 11, wherein converting the securities trade data further comprises rejecting bad message-based securities trade data by the message to file converter computer software application process executing on the computer.

17. The method of claim 1, wherein translating the securities trade data further comprises translating the securities trade data that is received in file form to the intermediary file format by a message format library computer software application process executing on the computer.

18. The method of claim 17, wherein translating the securities trade data further comprises receiving the securities trade data in file form by the message format library from a input file transfer service computer software application process executing on the computer.

19. The method of claim 18, wherein translating the securities trade data further comprises rejecting bad files by the input file transfer service computer software application process executing on the computer.

20. The method of claim 1, wherein translating the intermediary file format securities trade data further comprises translating the intermediary file format securities trade data to the preferred file formats of the plurality of destinations by a message format library computer software application process executing on the computer.

21. The method of claim 20, wherein translating the intermediary file format securities trade data further comprises receiving the intermediary file format securities trade data by the message format library computer software application process executing on the computer from an output file transfer service computer software application process executing on the computer.

22. The method of claim 21, wherein translating the intermediary file format further comprises receiving the intermediary file format securities trade data by the output file transfer service computer software application process executing on the computer from at least one of a message to file converter computer software application process executing on the computer and an input file transfer service computer software application process executing on the computer.

23. The method of claim 1, wherein sending the securities trade data further comprises sending the securities trade data in the preferred file format via a file transfer service computer software application process executing on the computer.

24. The method of claim 23, wherein sending the securities trade data further comprises sending the securities trade data in the preferred file format by an output file transfer service computer software application process executing on the computer.

25. The method of claim 24, wherein sending the securities trade data further comprises sending the securities trade data in the preferred file format by the output file transfer service computer software application process executing on the computer to a file transfer service client.

26. The method of claim 1, wherein sending the securities trade data further comprises sending the securities trade data in the preferred file formats to the plurality of destinations according to a predefined schedule.

27. The method of claim 1, wherein sending the securities trade data further comprises sending the securities trade data in the preferred file format to at least one plan sponsor.

28. The method of claim 1, further comprising further sorting the intermediary file format securities trade data according to at least one predefined requirement of each of the plurality of destinations.

29. A machine for managing communication of securities trade data to a plurality of destinations, comprising:
a computer having a microprocessor coupled to memory, wherein the microprocessor is programmed for:
receiving securities trade data in both file form and a plurality of different financial markets trade message protocol formats;
converting the securities trade data that is received in the plurality of different financial markets trade message protocol formats to an intermediary file format;
translating the securities trade data that is received in file form to the intermediary file format;
aggregating the intermediary file format securities trade data according to source;
sorting the intermediary file format securities trade data according to securities trade type;
translating the aggregated and sorted intermediary file format securities trade data to preferred file formats of the plurality of destinations; and
sending the securities trade data in the preferred file formats to the plurality of destinations.

30. The system of claim 29, wherein receiving the securities trade data further comprises receiving the securities trade data from a plurality of fund managers.

31. The system of claim 29, wherein receiving the securities trade data further comprises receiving the securities trade data according to a predefined schedule.

32. The system of claim 29, wherein receiving the securities trade data in file form further comprises receiving the securities trade data in file form via a file transfer service computer software application process executing on the computer.

33. The system of claim 32, wherein receiving the securities trade data in file form via the file transfer service further comprises receiving the securities trade data in file form by an input file transfer service computer software application process executing on the computer from a file transfer service client.

34. The system of claim 33, wherein receiving the securities trade data by the file transfer service further comprises rejecting bad file form securities trade data by the input file transfer service computer software application process executing on the computer.

35. The system of claim 29, wherein receiving the securities trade data in file form further comprises receiving the securities trade data in ASCII file form.

36. The system of claim 29, wherein receiving the securities trade data in the plurality of different financial markets trade message protocol formats further comprises receiving the securities trade data in message-based form via a message network.

37. The system of claim 36, wherein receiving the securities trade data in message-based form via the message network further comprises receiving the securities trade data in message-based form by a message agent computer software application process executing on the computer from a message node.

38. The system of claim 29, wherein receiving the securities trade data in the plurality of different financial markets trade message protocol formats further comprises receiving the securities trade data in at least SWIFT message form and ISITC message form.

39. The system of claim 29, wherein converting the securities trade data further comprises converting the securities trade data that is received in the plurality of different financial markets trade message protocol formats to file form by a message to file converter computer software application process executing on the computer.

40. The system of claim 39, wherein converting the securities trade data further comprises receiving the securities trade data in the plurality of different financial markets trade message protocol formats by the message to file converter computer software application process executing on the computer from a message agent computer software application process executing on the computer.

41. The system of claim 39, wherein converting the securities trade data further comprises translating the converted file form securities trade data to the intermediary file format.

42. The system of claim 41, wherein converting the file form securities trade data further comprises translating the converted file form securities trade data to the intermediary file format by a message format library computer software application process executing on the computer.

43. The system of claim 42, wherein converting the file form securities trade data further comprises receiving the converted file form securities trade data by the message format library computer software application process executing on the computer from the message to file converter computer software application process executing on the computer.

44. The system of claim 39, wherein converting the securities trade data further comprises rejecting bad message-based securities trade data by the message to file converter computer software application process executing on the computer.

45. The system of claim 29, wherein translating the securities trade data further comprises translating the securities trade data that is received in file form to the intermediary file format by a message format library computer software application process executing on the computer.

46. The system of claim 45, wherein translating the securities trade data further comprises receiving the securities trade data in file form by the message format library from a input file transfer service computer software application process executing on the computer.

47. The system of claim 46, wherein translating the securities trade data further comprises rejecting bad files by the input file transfer service computer software application process executing on the computer.

48. The system of claim 29, wherein translating the intermediary file format securities trade data further comprises translating the intermediary file format securities trade data to the preferred file formats of the plurality of destinations by a message format library computer software application process executing on the computer.

49. The system of claim 48, wherein translating the intermediary file format securities trade data further comprises receiving the intermediary file format securities trade data by the message format library computer software application process executing on the computer from an output file transfer service computer software application process executing on the computer.

50. The system of claim 49, wherein translating the intermediary file format securities trade data further comprises receiving the intermediary file format securities trade data by the output file transfer service computer software application process executing on the computer from at least one of a message to file converter computer software application process executing on the computer and an input file transfer service computer software application process executing on the computer.

51. The system of claim 29, wherein sending the securities trade data further comprises sending the securities trade data in the preferred file format via a file transfer service computer software application process executing on the computer.

52. The system of claim 51, wherein sending the securities trade data further comprises sending the securities trade data in the preferred file format by an output file transfer service computer software application process executing on the computer.

53. The system of claim 52, wherein sending the securities trade data further comprises sending the securities trade data in the preferred file format by the output file transfer service computer software application process executing on the computer to a file transfer service client.

54. The system of claim 29, wherein sending the securities trade data further comprises sending the securities trade data in the preferred file formats to the plurality of destinations according to a predefined schedule.

55. The system of claim 29, wherein sending the securities trade data further comprises sending the securities trade data in the preferred file format to at least one plan sponsor.

56. The system of claim 29, further comprising further sorting the intermediary file format securities trade data according to at least one predefined requirement of each of the plurality of destinations.

57. A method for managing communication of to a plurality of destinations, comprising:
receiving, using a computer having a microprocessor coupled to memory, securities trade data in file form by an input file transfer service computer software application process executing on the computer;
translating, using the computer, the file form securities trade data to an intermediary format by a message format library computer software application process executing on the computer;
aggregating, using the computer, the intermediary file format securities trade data translated from file form, according to source, by an interested parties notification computer software application process application executing on the computer;
sorting, using the computer, the intermediary file format securities trade data translated from file form, according securities trade type, by the interested parties notification computer software application process application executing on the computer;
sending, using the computer, the aggregated and sorted securities trade data in intermediary format to an output file transfer service computer software application process executing on the computer by the input file transfer service server computer software application process executing on the computer;
receiving, using the computer, securities trade data by a message agent computer software application process executing on the computer in a plurality of different financial markets trade message protocol formats;
converting, using the computer, the securities trade data that is received in the plurality of different financial markets trade message protocol formats to file form by a message to file converter computer software application process executing on the computer;
translating, using the computer, the converted file form securities trade data- to the intermediary format by a message format library computer software application process executing on the computer;

aggregating, using the computer, the intermediary file format securities trade data converted from file form according to source by the interested parties notification computer software application process application executing on the computer;

sorting, using the computer, the intermediary file format securities trade data converted from file form according to securities trade type by the interested parties notification computer software application process application executing on the computer;

sending, using the computer, the aggregated and sorted securities trade data in intermediary format to the output file transfer service computer software application process executing on the computer by the message to file converter computer software application process executing on the computer;

translating, using the computer, the intermediary format securities trade data to preferred formats of the plurality of destinations by a message format library computer software application process executing on the computer; and sending, using the computer, the securities trade data in the preferred formats to the plurality of destinations by the output file transfer service computer software application process executing on the computer.

* * * * *